A. M. DEMUTH.
COOKING APPARATUS.
APPLICATION FILED OCT. 1, 1920.
1,393,762. Patented Oct. 18, 1921.
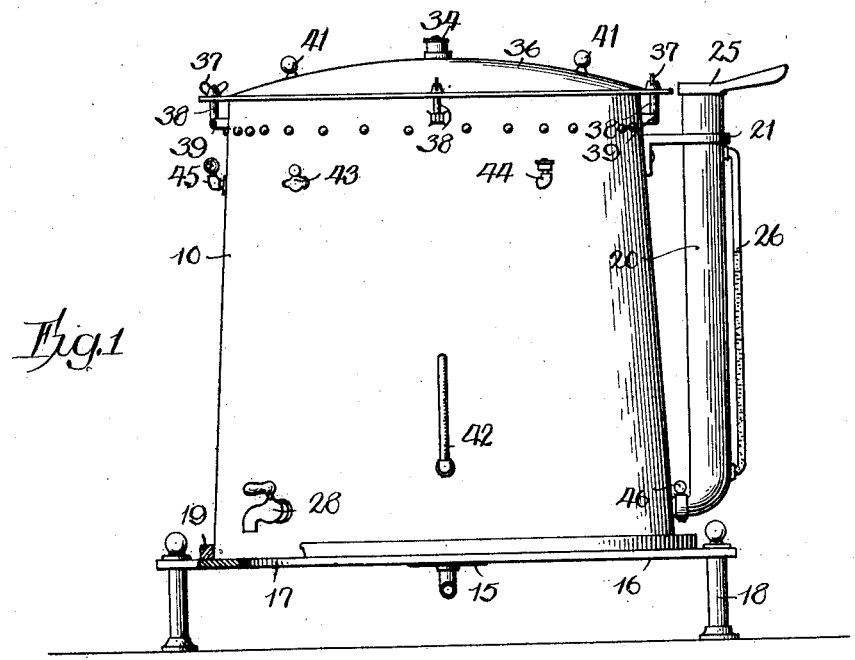
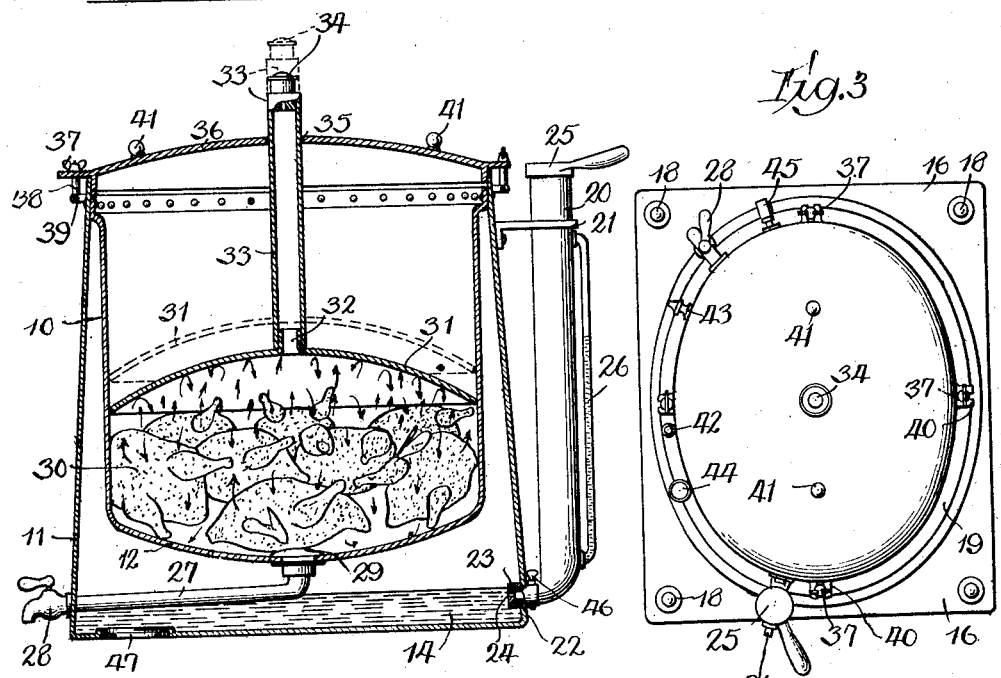
Inventor,
Alfred M. Demuth,
By: [signature] Atty.

UNITED STATES PATENT OFFICE.

ALFRED M. DEMUTH, OF CHICAGO, ILLINOIS, ASSIGNOR TO DEMUTH MANUFACTURING COMPANY, OF CHICAGO, ILLINOIS, A CORPORATION OF ILLINOIS.

COOKING APPARATUS.

1,393,762. Specification of Letters Patent. Patented Oct. 18, 1921.

Application filed October 1, 1920. Serial No. 414,104.

*To all whom it may concern:*

Be it known that I, ALFRED M. DEMUTH, a citizen of the United States, residing at Chicago, in the county of Cook and State of Illinois, have invented certain new and useful Improvements in Cooking Apparatus, of which the following is a specification.

This invention relates to improvements in cooking apparatus in which articles of food may be cooked entirely in their own juices by means of the heat of boiling or hot water or steam maintained under a predetermined degree of pressure, and one of the objects of the invention is to provide improved means whereby the liquid which is converted into steam may be automatically replenished when necessary, thereby obviating the necessity of having to fill or supply the same or having to watch the apparatus, and also rendering it possible to use the apparatus with a very small supply of liquid so that the liquid will be quickly converted into steam or vapor.

A further object is to provide an improved freely movable baffle or deflector adapted to maintain the pressure therebeneath at a predetermined degree and operating to direct or deflect the vapor back to the articles being cooked, the deflector having means associated therewith whereby the vapor when it rises above a predetermined degree will be vented directly from the cooking chamber and from beneath the baffle into the atmosphere.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a view in side elevation.

Fig. 2 is a vertical, longitudinal sectional view.

Fig. 3 is a top plan view of Fig. 1.

Referring more particularly to the drawing the numeral 10 designates a cooking chamber which may be of any desired size and configuration and constructed of any suitable material, but is preferably oval in cross section and is constructed of metal. Arranged beneath the cooking chamber 10 is a supplemental chamber 11, which is closed and of which chamber 11, the bottom 12, of the cooking chamber 10, forms one wall. The chamber 11, may be formed in any suitable manner, preferably separately from the chamber 10, and secured thereto in any suitable manner as by means of suitable fastening devices such as rivets or the like.

The chamber 11, is adapted to hold a supply of liquid 14, which is converted into steam by means of a suitable burner 15, arranged beneath the chamber and the whole apparatus may, if desired, be mounted upon a suitable support 16, having an opening 17, therethrough over which the cooking apparatus is adapted to be set and the support 16, may be mounted upon suitable legs 18, and provided with a flange 19, encompassing the opening 17, and within which flange 19, the apparatus is adapted to be placed.

The liquid is supplied to the compartment 11, preferably from a container or tank 20, which may be of any suitable size and configuration and is connected with the apparatus in any suitable manner such as by means of a bracket 21. At the lower end of the tank 20, there is provided a tubular extension 22, which is adapted to fit within a suitable opening in the wall of the chamber 11, and a cap 23, may be provided for the extension 22, and which cap is provided with a reduced opening 24, through which the liquid will flow from the tank 20, into the chamber 11. The opening 24 is spaced any desired distance above the bottom of the chamber 11, and maintains the liquid at a predetermined level in the tank. This is accomplished by means of the fact that the tank 20, is provided with a closure 25, so that when the liquid 14, in the chamber 11, extends slightly above the opening 24, to close the same the liquid will be arrested from flowing into the chamber 11, until the liquid therein has been consumed.

A liquid gage 26, may be provided for the tank 20, if desired.

A draw off pipe 27, is connected at one end with the bottom 12, of the chamber 10. This draw off pipe extends through the chamber 11, and through one wall thereof terminating in a faucet or cock 28, which latter when open will permit the liquid to be drawn from the chamber 10. When cooking articles of food which do not contain much juice and it is desired to retain the juice within the chamber 10, thereby preventing it from filling the draw off pipe 27, a suitable plug 29, may be provided for closing the communicating opening between the chamber 10 and the pipe 27.

The articles of food 30, to be cooked are placed within the chamber 10, upon the bottom 12, and a deflector 31, which is preferably of a downwardly opening or concaved configuration is placed over the articles so that the edge thereof will rest upon the articles. The deflector is of a size and shape to snugly fit within the chamber 10, and yet will permit the deflector or baffle to rise and fall under the influence of the vapor therebeneath. This deflector or baffle is provided with an opening 32, therethrough and connected therewith is a tubular member 33, which has communication with the opening 32. This tubular member 33 projects for a considerable distance above the deflector or baffle and a safety or blow off valve 34, is arranged preferably at the top of the tubular member 33, to close the same. The tubular member 33, passes snugly through an opening 35, in a cover or closure 36, which latter is provided for the chamber 10. This cover 36, is secured against removal in any suitable manner such as by means of thumb nuts 37, connected with bolts 38, which latter are pivotally connected as at 39, with the wall of the chamber 11, and the bolts 38, pass through or stand within suitable bifurcations or ears 40, carried by the cover or closure 36.

Handles 41, may be provided upon the cover or closure 36.

In order to ascertain the temperature of the liquid within the chamber 11, a suitable thermometer 42, may be provided and a blow off or pet cock 43, may also be provided so as to permit the air contained within the chamber 11 to be blown off while the liquid 14, is being converted into steam. A safety blow off 44, may also be provided to permit of the escape of the steam when the latter rises beyond a predetermined degree and a pressure gage 45 is also connected with the chamber 11.

When it is desired to fill the tank or receptacle 20, a suitable valve 46, which controls the outlet opening therefrom is closed and when a sufficient amount of liquid has been placed therein the closure or cover 25, is placed in position, after which the valve 46, is opened and the liquid will flow through the opening 24, until it reaches a predetermined level. As the liquid is consumed it will be replenished automatically from the supply in the tank or container 20.

In use, the articles 30, are placed in the chamber 10, in the manner already described with the baffle 31, resting thereupon. As the articles commence to cook the steam or vapor therefrom will rise and will contact with the baffle or deflector 31, to flow thereacross and will be deflected by this baffle back against the articles 30. The deflector 31, together with the tubular member 33, and blow off valve 34, are constructed so as to withstand a predetermined degree of pressure of the steam or vapor against the deflector and the blow off valve 34, is set so as to withstand a slightly increased degree of pressure so that when the pressure increases beyond a predetermined degree, the first operation will be to cause the deflector 31, to rise bodily away from the articles 30, into the dotted line position shown in Fig. 2. If there is any further increase in pressure the valve 34, will be automatically opened to allow the escape of the steam or vapor from beneath the baffle and directly into the atmosphere. When the pressure decreases beneath the baffle 31, the latter will gravitate toward the articles. The tubular member 33, having a snug fit 35 in the cover 36, will be permitted to rise and fall under the influence of the pressure upon the baffle caused by the vapor, and as the cover 36, is securely held against movement, it will be manifest that the baffle 31, will have a free movement and will be unsupported except by resting upon the articles or by being supported by the pressure of the steam or vapor therebeneath.

A clean-out opening may be provided in the bottom of the chamber 11, and a removable closure 47 is provided for such an opening.

While the preferred form of the invention has herein been shown and described it is to be understood that various changes may be made in the details of construction and in the combination and arrangement of the several parts, within the scope of the claims, without departing from the spirit of this invention.

What is claimed as new is:

1. A cooking apparatus embodying a cooking chamber, a detached downwardly opening deflector within and extending across the chamber, said deflector being adapted to engage and rest against the articles of food in the chamber and operating to direct vapor circulating thereagainst back against the articles of food, a closure for the chamber, a tubular member connected with the baffle, opening therethrough and extending thereabove, and a safety blow off valve for controlling the opening in the tubular member, the said closure having an opening therethrough and through which opening the said tubular member freely slides by the rising and falling movements of the baffle caused by the influence of the vapor acting thereon.

2. A cooking apparatus embodying a cooking chamber, a baffle within and extending across the chamber, said baffle being freely movable toward and away from the articles and adapted to engage and rest upon the articles and serving to direct the vapor circulating thereagainst, back to the articles, a closure for the chamber, and means whereby the vapor beneath the baffle will be discharged directly from the cooking chamber when the pressure therebeneath rises beyond a predetermined degree.

3. A cooking apparatus embodying a cooking chamber, a baffle within and extending across the chamber, said baffle being of a concaved configuration snugly fitting within the chamber to be freely moved away from and toward the articles by the action of the vapor thereupon, and serving to direct the vapor circulating thereagainst, back to the articles, a closure for the chamber, and means whereby the vapor beneath the baffle will be discharged directly from the cooking chamber when the pressure therebeneath rises beyond a predetermined degree.

4. A cooking apparatus embodying a liquid chamber in which the liquid is converted into steam, a cooking chamber extending across the liquid chamber and being out of communication therewith, a liquid supply holder, and means whereby the said supply will automatically maintain the liquid at a predetermined level in the said liquid chamber, the said cooking chamber and liquid supply holder being so disposed with respect to each other that access may be had to either without interfering with the other.

5. A cooking apparatus embodying a liquid chamber in which the liquid is converted into steam, a cooking chamber extending across the liquid chamber and being out of communication therewith, a liquid supply holder, means whereby the said supply will automatically maintain the liquid at a predetermined level in the said liquid chamber, said liquid chamber being closed, and a safety blow off device for the liquid chamber, the said cooking chamber and liquid supply holder being so disposed with respect to each other that access may be had to either without interfering with the other.

6. A cooking apparatus embodying a closed liquid chamber in which the liquid is converted into vapor, a cooking chamber one wall of which constitutes a wall of the liquid chamber, said chambers being out of communication with each other, a liquid supply receptacle, there being a communicating passage between the supply receptacle and the liquid chamber for automatically maintaining the liquid in the liquid chamber at a predetermined level, said supply receptacle having a filling opening, a closure for said opening, and a valve in the said passage for opening and closing the passage at will, the said cooking chamber and liquid supply receptacle being so disposed with respect to each other that access may be had to either without interfering with the other.

7. A cooking apparatus embodying a cooking chamber, a liquid tank in which the liquid is converted into vapor, said tank and chamber being out of communication with each other and having a common wall therebetween, means operating automatically to maintain the liquid in the tank at a predetermined level, the said means embodying a liquid supply holder, a closure therefor, said supply holder having communication with the tank and discharging thereinto, and a valve in the said communication for opening and closing the same, the said tank and supply holder being so disposed with respect to each other that access may be had to either without interfering with the other.

In testimony whereof I have signed my name to this specification, on this 22nd day of September A. D. 1920.

ALFRED M. DEMUTH.